No. 721,073. PATENTED FEB. 17, 1903.
W. NICHOLLS.
APPARATUS FOR SUPPLYING AERATED LIQUIDS FROM BULK ON DRAFT.
APPLICATION FILED MAY 27, 1901.
NO MODEL. 2 SHEETS—SHEET 1.
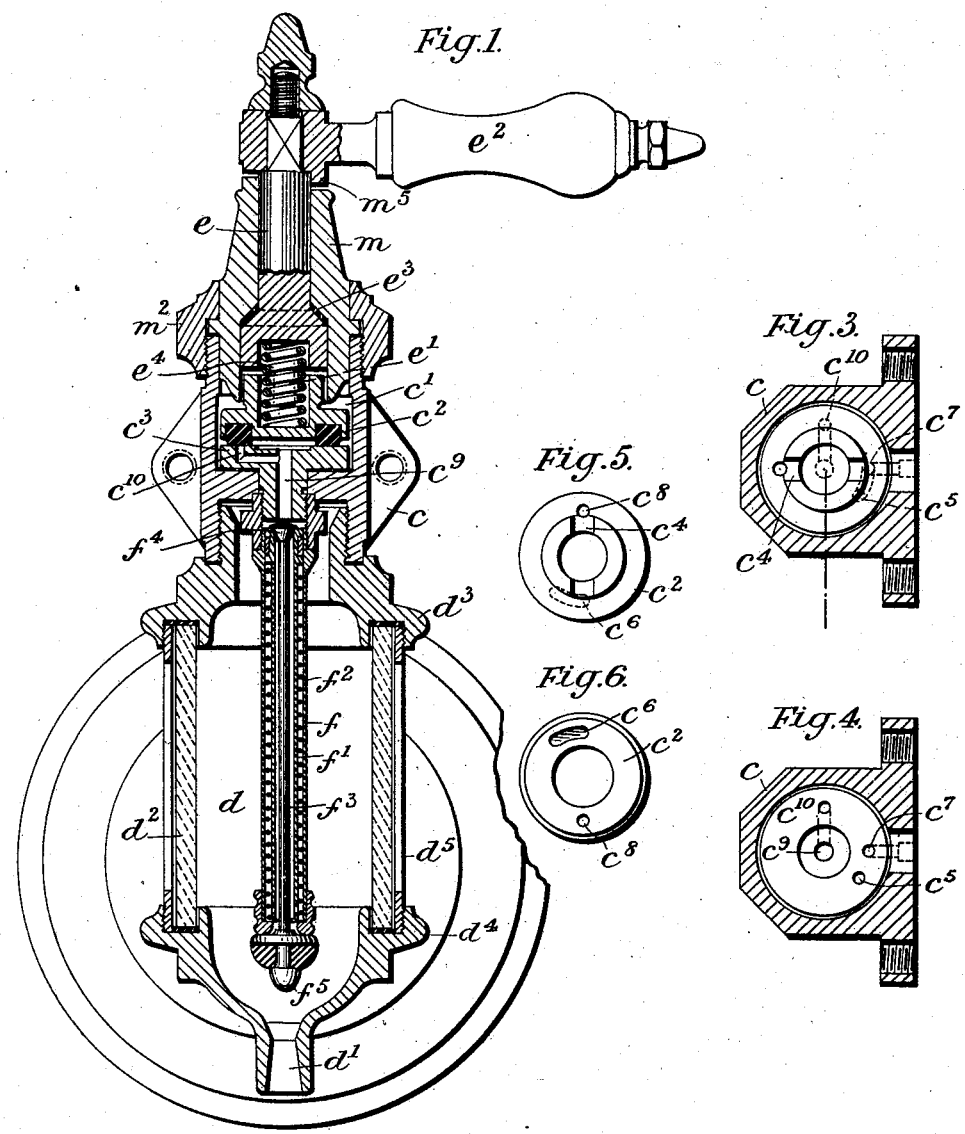
WITNESSES.
Samuel Percival
Albert Jones.
INVENTOR.
William Nicholls
By his Attorneys.
Wheatley & MacKenzie.

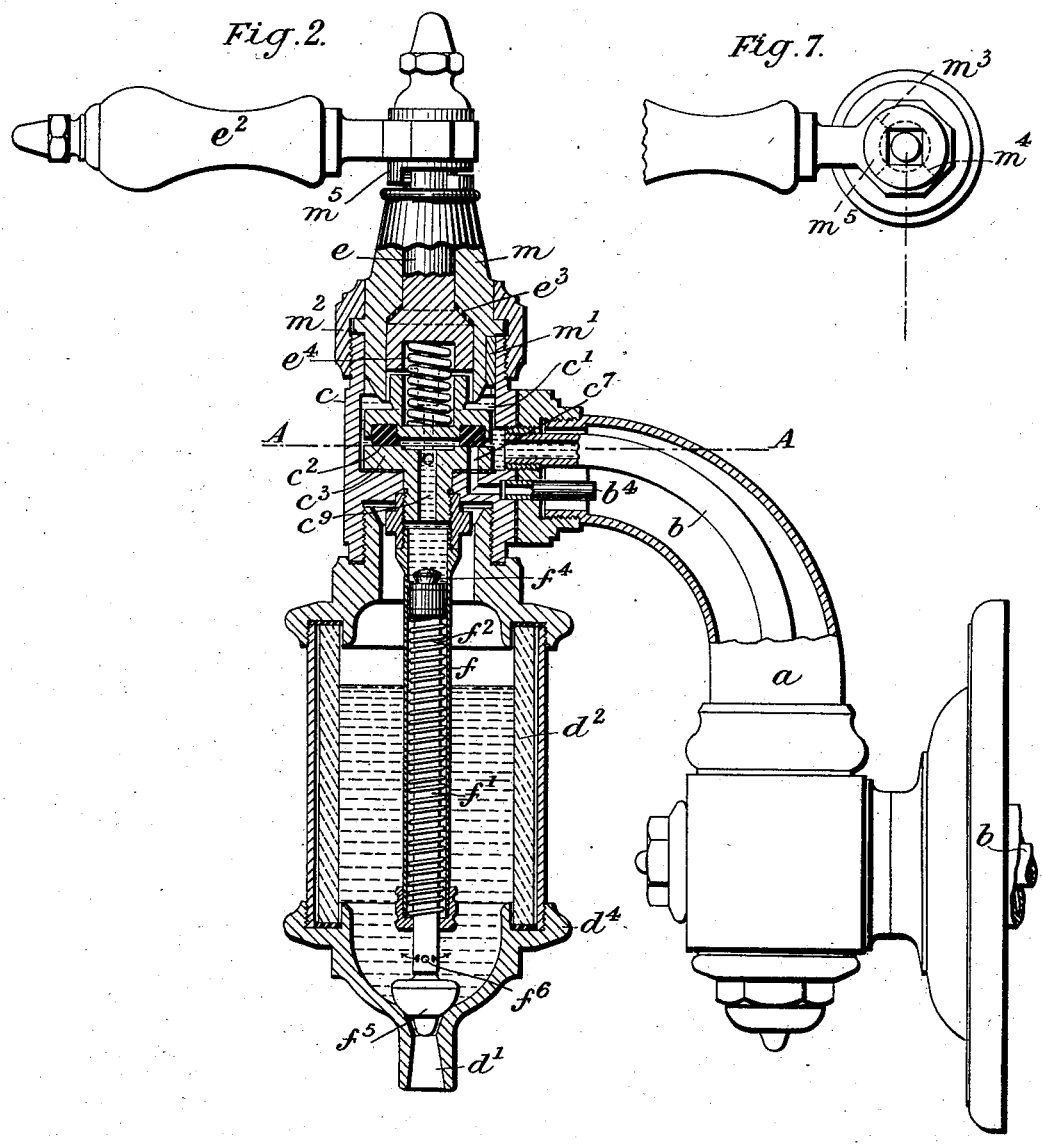

UNITED STATES PATENT OFFICE.

WILLIAM NICHOLLS, OF HOLBORN, LONDON, ENGLAND.

APPARATUS FOR SUPPLYING AERATED LIQUIDS FROM BULK ON DRAFT.

SPECIFICATION forming part of Letters Patent No. 721,073, dated February 17, 1903.

Application filed May 27, 1901. Serial No. 62,112. (No model.)

*To all whom it may concern:*

Be it known that I, WILLIAM NICHOLLS, a subject of the King of Great Britain and Ireland, residing at 8 Barnards Inn, Holborn, London, England, have invented certain new and useful Improvements in Apparatus for Supplying Aerated Liquids from Bulk on Draft; and I do hereby declare the following to be a full, clear, and exact description of the invention, such as will enable others skilled in the art to which it appertains to make and use the same.

This invention for improvements in apparatus for supplying aerated liquids from bulk on draft relates to apparatus in which the aerated liquid is stored in a reservoir at a high pressure and from which reservoir any desired quantity can be drawn off into a measuring vessel and when the measuring vessel is shut off from the reservoir its contents can be discharged. Apparatus of this class consists of a reservoir for containing aerated liquid under pressure, a measuring vessel, a controlling-valve governing the supply of aerated liquid from the reservoir to the measuring vessel and an atmospheric communication at the top of the measuring vessel, and an automatic valve closing the outlet from the measuring vessel operated by the pressure in the vessel. In operation the operating-valve is operated to close the atmospheric communication to the top of the measuring vessel and open the supply to the reservoir of aerated water. The aerated water enters the measuring vessel, and the pressure closes the automatic outlet-valve. When the operating-valve is again returned to its initial position, the reservoir of aerated liquid is cut off from the measuring vessel and the communication of the top of the vessel with the atmosphere is opened. The aerated liquid in the measuring vessel is thus shifted and then the automatic valve automatically opens the outlet, so that the contents flow quietly out from the vessel. It will readily be seen that for the practical success of such an apparatus the controlling-valve shall be gas-tight and shall be movable only between its two operative positions, so that it shall be impossible that the aerated liquid can be discharged under pressure.

In carrying out this invention the above conditions are obtained by combining a rotatable valve pressed onto its seat by the pressure of the aerated water, a detachable operating-spindle engaging in with the rotatable valve and stops that limit the motion of the operating-spindle. The spindle passes through a sleeve fitting into the valve-body and provided with a key or feather to prevent its rotation in the valve-body. The sleeve is held in place axially by a sleeve-nut screwing onto the valve-body. The top of the sleeve projects through the nut and a part of the projection is cut away. An operating-handle fixed on the valve-spindle works between the stops formed by the above cut-away part. The stop insures that the aerated liquid shall be drawn off quietly.

In the accompanying drawings, Figure 1 is a vertical section of the apparatus constructed according to this invention. Fig. 2 is a vertical section taken at right angles to Fig. 1. Fig. 3 is a cross-section of the valve-body on the line A A, Fig. 2, showing the valve resting on its seat. Fig. 4 is a similar cross-section with the valve removed. Figs. 5 and 6 are plan and inverted plan, respectively, of the valve. Fig. 7 is a detail plan of the operating handle and spindle and sleeve in which the spindle works.

An arm or bracket $a$ supports the valve-body $c$ and measuring vessel $d$ and incloses a pipe $b$, communicating with the valve-chamber $c'$ and with a reservoir containing aerated liquid at a high pressure. The face-valve $c^2$ within the valve-chamber $c'$ controls the passage of the aerated liquid to the measuring vessel $d$ and also the escape of the gas therefrom. The said valve rests on a seating $c^3$ and is rotated by the horns $e'$, which project from the spindle $e$, carrying the operating-handle $e^2$, and engage freely in notches $c^4$ in the valve. The spindle $e$ passes through a sleeve $m$, and a collar on the spindle bears against the packing $e^3$ in the sleeve. The sleeve fits in the end of the valve-body $c$ and is prevented from rotating in the valve-body by the key or feather $m'$. The cap-nut $m^2$, screwing onto the end of the valve-body $c$, bears on an external collar on the sleeve and keeps the sleeve in place axially. A packing is interposed between the top of the valve-body and the collar of the sleeve. The upper end of the sleeve $m$ projects through the cap-nut and is cut away between the points $m^3 m^4$, and a stop $m^5$ on the handle $e^2$ works between the points $m^3 m^4$. The valve is held down upon its seating $c^3$ and the valve-spindle up against its seating $e^3$ by the compression-spring $e^4$ and by the pressure of the liquid.

Connected to the valve-body and centrally under the valve-seating is a tube $f$, that passes down through the measuring-vessel $d$ and in which works a hollow piston and piston-rod $f'$, supported in their normal raised position by the spring $f^2$ and provided with perforations $f^6$ at its bottom. The spindle $f^3$ passes through the hollow piston-rod and is provided at its top end with a valve $f^4$, adapted to open and close the annular passage between the piston-rod and spindle $f^3$, and at its lower end with a plug or stopper $f^5$, adapted to close the spout orifice or outlet $d'$ from the measuring vessel $d$, as is shown in Fig. 2.

The measuring vessel $d$ comprises an open-ended glass cylinder $d^2$, held between the ends $d^3 d^4$ of the metal cage $d^5$. The hole $c^5$ in the valve-seat communicates with the top of the measuring vessel. The hole $c^7$ in the valve-seat communicates with the pipe $b^4$, that opens out into the arm or bracket $a$, and is thus in communication with the atmosphere. The hole $c^{10}$ in the valve-seat communicates with the central passage $c^9$ through the valve-seat, and thus with the tube $f$. The valve is recessed at its center and is provided with the recess $c^6$ in its face and with the hole $c^8$, passing completely through it and always containing aerated liquid under pressure.

In Fig. 1 the various parts are shown in their normal positions with the stop $m^5$ of the handle against the edge $m^4$, the measuring vessel $d$ being opened to the atmosphere at the spout $d'$, and through the hole $c^5$ in the valve-seat the recess $c^6$ in the face of the valve and the hole $c^7$ in the valve-seat communicating with the space in the arm or bracket $a$, surrounding the supply-pipe $b$, the inlet $c^8$ being opposite a solid portion of the valve-seating, so that the high-pressure liquid in the chamber $c'$ is cut off from the central chamber $c^9$, and thus from the measuring vessel $d$. In Fig. 3 the valve is shown in the same position as in Fig. 1. Upon turning the handle $e^2$, and with it the valve $c^2$, to the position shown in Fig. 2, with the stop $m^5$ against the edge $m^3$, the recess $c^6$ in the valve is removed from the holes $c^5$ and $c^7$, and the inlet $c^8$ is brought over the hole $c^{10}$ in the valve-seat communicating with the central chamber $c^9$. The high-pressure liquid entering the chamber $c^9$ drives down the piston $f'$, and with it the valve-spindle $f^3$, until the plug $f^5$ meets the bottom of the vessel $d$, when by the continued downward movement of the piston $f'$ the valve $f^4$ is caused to leave its seating and to allow the liquid to pass through the hollow piston-rod and enter the measuring vessel $d$ through the orifices $f^6$ in the piston-rod. The liquid continues rising in the vessel $d$ until the pressure of the gas confined above its surface is equal to the pressure with which the liquid is entering, after which no further movement of the liquid occurs. On returning the valve to the position shown in Fig. 1 the confined gas is allowed to escape through the hole $c^5$, recess $c^6$, and hole $c^7$ into the arm or bracket $a$, when the piston $f'$ immediately returns to its normal position, opening the spout-orifice $d'$, and thus allowing the liquid to discharge itself freely and without shock into a glass or other receptacle held to receive it.

What I claim, and desire to secure by Letters Patent, is—

In an apparatus for supplying aerated liquids from bulk on draft, the combination of a valve-seat having a central longitudinal passage, a passage $c^{10}$, at an angle thereto and communicating therewith, a hole $c^5$ and a lateral passage $c^7$, with a rotatable controlling-valve having notches and forced into its seat by pressure of the aerated liquid and having a central recess, a recess $c^8$ extending through said valve and a curved recess $c^6$ in its face, and a hole $c^8$; a spindle provided with horns engaging said notches in the valve, a seating for the valve-spindle, an operating-handle on the spindle, a stop on said handle, a sleeve through which the spindle passes and fitted in the end of the valve-body and prevented from rotating therein, a cap-nut through which the upper end of the sleeve projects, said upper end being cut away to provide points between which the stop on the handle works, and a spring acting to assist the pressure of the aerated liquid in holding the valve down on its seating and the valve-spindle up against its seating, all as and for the purpose specified.

In testimony whereof I affix my signature in presence of two witnesses.

WILLIAM NICHOLLS.

Witnesses:
ALBERT JONES,
HERBERT C. BOLWELL.